United States Patent
Ido

(10) Patent No.: US 7,534,196 B2
(45) Date of Patent: May 19, 2009

(54) AUTOMATIC STOP DEVICE AND METHOD FOR INTERNAL COMBUSTION ENGINE

(75) Inventor: Daisuke Ido, Nagoya (JP)

(73) Assignee: Toyota Jidosha Kanushiki Kaisha, Toyota-shi (JP)

( * ) Notice: Subject to any disclaimer, the term of this patent is extended or adjusted under 35 U.S.C. 154(b) by 430 days.

(21) Appl. No.: 11/522,392

(22) Filed: Sep. 18, 2006

(65) Prior Publication Data

US 2007/0066442 A1 Mar. 22, 2007

(30) Foreign Application Priority Data

Sep. 20, 2005 (JP) .............. 2005-272202

(51) Int. Cl.
B60W 10/04 (2006.01)
(52) U.S. Cl. ...................... 477/107; 477/106
(58) Field of Classification Search ................. 477/101, 477/105, 106, 107
See application file for complete search history.

(56) References Cited

U.S. PATENT DOCUMENTS

| 5,451,820 | A * | 9/1995 | Gotoh et al. | 307/10.6 |
| 6,793,059 | B2 * | 9/2004 | Okada et al. | 192/84.1 |
| 7,079,941 | B2 * | 7/2006 | Tetsuno et al. | 701/112 |
| 7,231,284 | B2 * | 6/2007 | Itoh et al. | 701/22 |

FOREIGN PATENT DOCUMENTS

| JP | 63-75323 | 4/1988 |
| JP | 63-248936 | 10/1988 |
| JP | 2-53533 | 4/1990 |
| JP | 5-1592 | 1/1993 |
| JP | 5-14664 | 2/1993 |
| JP | 5-52372 | 7/1993 |
| JP | 6-73469 | 10/1994 |
| JP | 10-184724 | 7/1998 |
| JP | 2000-303870 | 10/2000 |
| JP | 2007120109 A * | 5/2007 |

* cited by examiner

*Primary Examiner*—Ha D. Ho
(74) *Attorney, Agent, or Firm*—Oblon, Spivak, McClelland, Maier & Neustadt, P.C.

(57) ABSTRACT

An ECU executes a program including the steps of detecting a stroke amount SP of a clutch pedal, a value I of current flowing through a solenoid valve of a normally-closed type provided at a pipe coupling a master cylinder and a clutch release cylinder, and a stroke amount SC of the clutch release cylinder, and permitting performing of idle stop when a condition that the stroke amount SP of the clutch pedal is at least a threshold value SP(1), a condition that stroke amount SC of the clutch release cylinder is at least a threshold value SC(0), and a condition that value I of current flowing through the solenoid valve is not larger than a threshold value I(0) are all satisfied.

5 Claims, 3 Drawing Sheets

AUTOMATIC STOP DEVICE AND METHOD FOR INTERNAL COMBUSTION ENGINE

This nonprovisional application is based on Japanese Patent Application No. 2005-272202 filed with the Japan Patent Office on Sep. 20, 2005, the entire contents of which are hereby incorporated by reference.

BACKGROUND OF THE INVENTION

1. Field of the Invention

The present invention relates to an automatic stop device and method for an internal combustion engine, and particularly to a technique of automatically stopping the internal combustion engine coupled to a transmission through a frictional engagement element brought into a released state by a driver's operation.

2. Description of the Background Art

There has conventionally been known a vehicle having a manual transmission (hereinafter also referred to as an MT) mounted thereon. In the MT, a clutch is brought into a released state or an engaged state by the operation of a clutch pedal. An operation of such an MT vehicle is burdensome in performing a hill-start or in low-speed running, and is difficult for an inexperienced driver. Accordingly, there has been proposed a technique of bringing a clutch into a released state or an engaged state independently of the operation of a clutch pedal.

Japanese Utility Model Laying-Open No. 05-014664 discloses a vehicle clutch device capable of reducing the burden of operating a clutch pedal. The vehicle clutch device described in Japanese Utility Model Laying-Open No. 05-014664 is a vehicle clutch device configured to transfer engine output torque to a transmission through a friction clutch, and to allow the clutch to be released by working hydraulic pressure generated by the operation of the clutch pedal. The vehicle clutch device includes a hydraulic pump generating working hydraulic pressure for release independently of the operation of the clutch pedal, an engine rotation speed detecting unit detecting a rotation speed of an engine, a vehicle speed detecting unit detecting a running speed of the vehicle, an accelerator pedal operated amount detecting unit detecting an operated amount of the accelerator pedal, and a hydraulic pressure control unit controlling the working hydraulic pressure for release generated by the hydraulic pump, based on the detected rotation speed of the engine, running speed of the vehicle, and operated amount of the accelerator pedal.

According to the vehicle clutch device described in the publication, the device is provided with a hydraulic pump that generates working hydraulic pressure for releasing the clutch independently of the clutch pedal, and the working hydraulic pressure for releasing the clutch, which working hydraulic pressure is generated by the hydraulic pump, is controlled based on the rotation speed of the engine, running speed of the vehicle, and operated amount of the accelerator pedal. Accordingly, when the clutch is required to be engaged and released in a repeated manner in a congested route and the like, it is possible to reduce the burden of the driver operating the clutch pedal.

In recent years, owing to increased awareness of environmental issues, more fuel-efficient vehicles are demanded. As a method of improving fuel efficiency of the vehicle, there has been known a technique called idle stop (which is also referred to as economy running or eco-run) with which an engine is automatically stopped when a vehicle temporarily stops at a red light and the like. However, Japanese Utility Model Laying-Open No. 05-014664 does not describe that idle stop is performed in a suitable manner in a vehicle where a clutch is engaged or released independently of the clutch pedal.

SUMMARY OF THE INVENTION

An object of the present invention is to provide an automatic stop device and method for an internal combustion engine, the automatic stop device and the method being capable of performing idle stop in a suitable manner.

An automatic stop device for an internal combustion engine according to an aspect of the present invention, automatically stops the internal combustion engine coupled to a transmission through a frictional engagement element brought into a released state by pressure generated by an operation of an operation unit. The automatic stop device includes: a control member provided between the operation unit and the frictional engagement element such that pressure applied to the frictional engagement element is maintained when no electric power is distributed to the control member; and a stop control unit stopping the internal combustion engine when a predetermined stop condition is satisfied. The stop condition is at least a condition that the frictional engagement element is in a released state and a condition that an amount of electric power distributed to the control member is smaller than a predetermined value.

According to the present invention, the frictional engagement element is brought into the released state by the pressure generated by the operation of the operation unit. The pressure is maintained by stopping electric power distribution to the control member provided between the operation unit and the frictional engagement element. In other words, when electric power distribution to the control member is stopped after the frictional engagement element is brought into the released state, the frictional engagement element is maintained in the released state. After that, if a stop condition, which is at least the condition that the frictional engagement element is in the released state and the condition that an amount of electric power distributed to the control member is smaller than the predetermined value, is satisfied, the internal combustion engine is stopped. Accordingly, it is possible to perform idle stop while electric power distribution to the control member is reduced and the frictional engagement element is maintained in the released state. At that time, electric power distribution to the control member is reduced, and hence fuel efficiency can further be improved. Furthermore, the frictional engagement element is in the released state, and hence it is possible to prevent the vehicle from accidentally moving when the internal combustion engine is restarted. It is therefore possible to provide an automatic stop device for an internal combustion engine, the automatic stop device being capable of performing idle stop in a suitable manner.

Preferably, the frictional engagement element is brought into the released state by hydraulic pressure generated by the operation of the operation unit. The control member shuts off an oil passage connecting the operation unit and the frictional engagement element when no electric power is distributed to the control member.

According to the present invention, the frictional engagement element is brought into the released state by hydraulic pressure. When electric power distribution to the control member is stopped, the control member shuts off the oil passage connecting the operation unit and the frictional engagement element, so that the hydraulic pressure applied to the frictional engagement element is maintained. It is therefore possible to maintain the frictional engagement element in the released state. Accordingly, it is possible to prevent the vehicle from accidentally moving when the internal combustion engine is restarted, and perform idle stop in a suitable manner.

A method of automatically stopping an internal combustion engine according to another aspect of the present invention is a method of automatically stopping an internal combustion engine coupled to a transmission through a frictional engagement element brought into a released state by pressure generated by an operation of an operation unit. The automatically stopping method includes the steps of: determining whether or not the frictional engagement element is in the released state; determining whether or not an amount of electric power distributed to a control member is smaller than a predetermined value, the control member being provided between the operation unit and the frictional engagement element for maintaining pressure applied to the frictional engagement element when no electric power is distributed thereto; and stopping the internal combustion engine on conditions that it is determined that the frictional engagement element is in the released state, and that it is determined that the amount of electric power distributed to the control member is smaller than the predetermined value.

According to the present invention, the frictional engagement element is brought into the released state by the pressure generated by the operation of the operation unit. The pressure is maintained by stopping electric power distribution to the control member provided between the operation unit and the frictional engagement element. In other words, when electric power distribution to the control member is stopped after the frictional engagement element is brought into the released state, the frictional engagement element is maintained in the released state. After that, on conditions that it is determined that the frictional engagement element is in the released state and that it is determined that an amount of electric power distributed to the control member is smaller than the predetermined value, the internal combustion engine is stopped. Accordingly, it is possible to perform idle stop while electric power distribution to the control member is reduced and the frictional engagement element is maintained in the released state. At that time, electric power distribution to the control member is reduced, and hence fuel efficiency can further be improved. Furthermore, the frictional engagement element is in the released state, and hence it is possible to prevent the vehicle from accidentally moving when the internal combustion engine is restarted. It is therefore possible to provide an automatic stop method for an internal combustion engine, the automatic stop method being capable of performing idle stop in a suitable manner.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
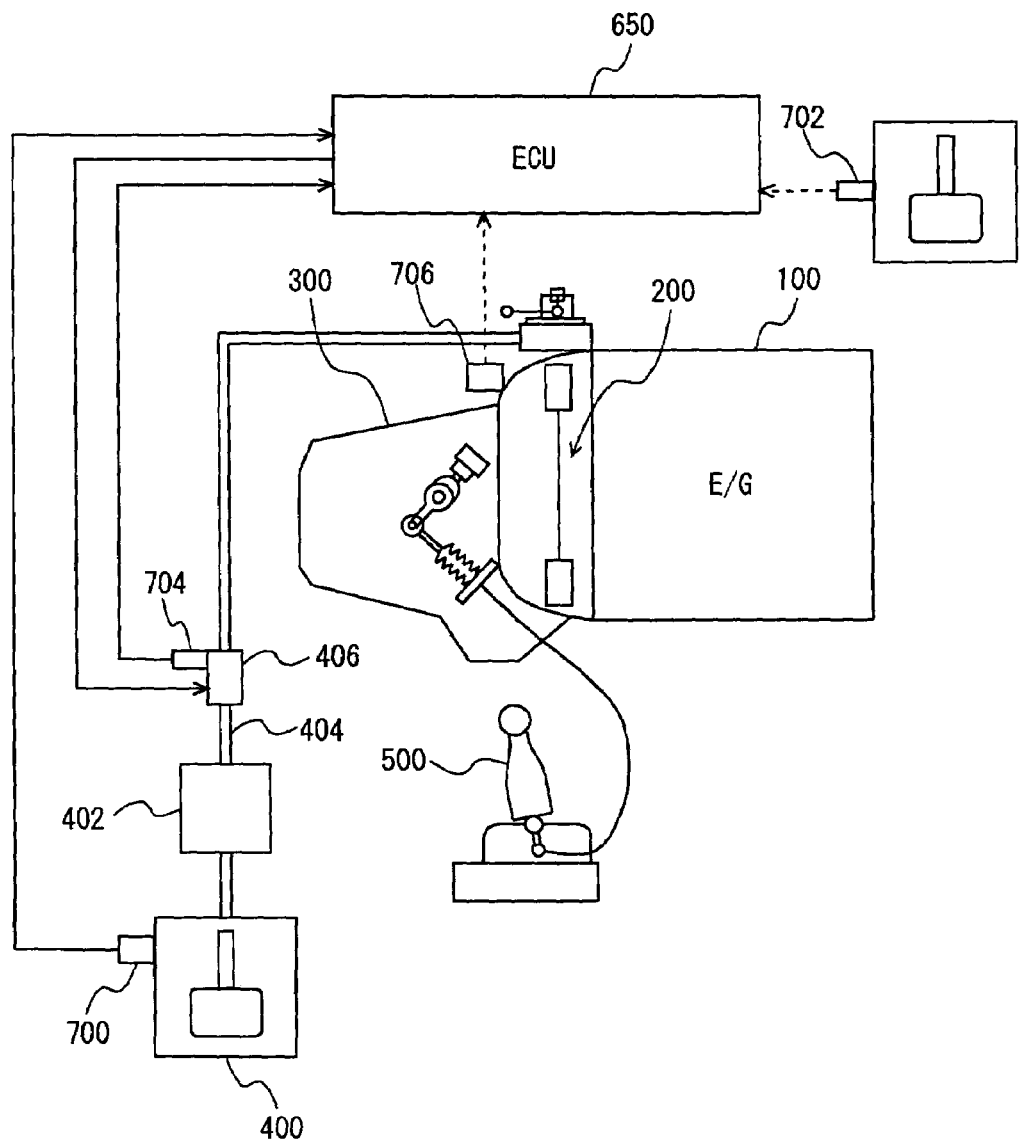
FIG. 1 is a schematic configuration diagram showing a power train of a vehicle on which an automatic stop device according to the present embodiments is mounted.

An embodiment of the present invention will hereinafter be described with reference to the drawings. In the following description, the same parts are denoted by the same reference characters, and the names and functions thereof are the same. Accordingly, the detailed description thereof will not be repeated.

Referring to FIG. 1, a power train of a vehicle having an automatic stop device according to the embodiment of the present invention mounted thereon will be described. The power train includes an engine 100, a clutch 200, and a transmission 300. Torque of engine 100 is transferred to transmission 300 through clutch 200. The torque transferred to a transmission 300 is transferred to a driving wheel (not shown) through a drive shaft (not shown). The automatic stop device according to the present embodiment is implemented with a program executed by, for example, an electronic control unit (ECU) 650.

When a driver depresses a clutch pedal 400, clutch 200 is released thereby. Clutch 200 will be described later. Transmission 300 is a manual transmission in which a driver operates a shift lever 500 for gear shifting. The gear shifting in transmission 300 may be performed by an actuator, based on the driver's shift operation.

Figure 2:
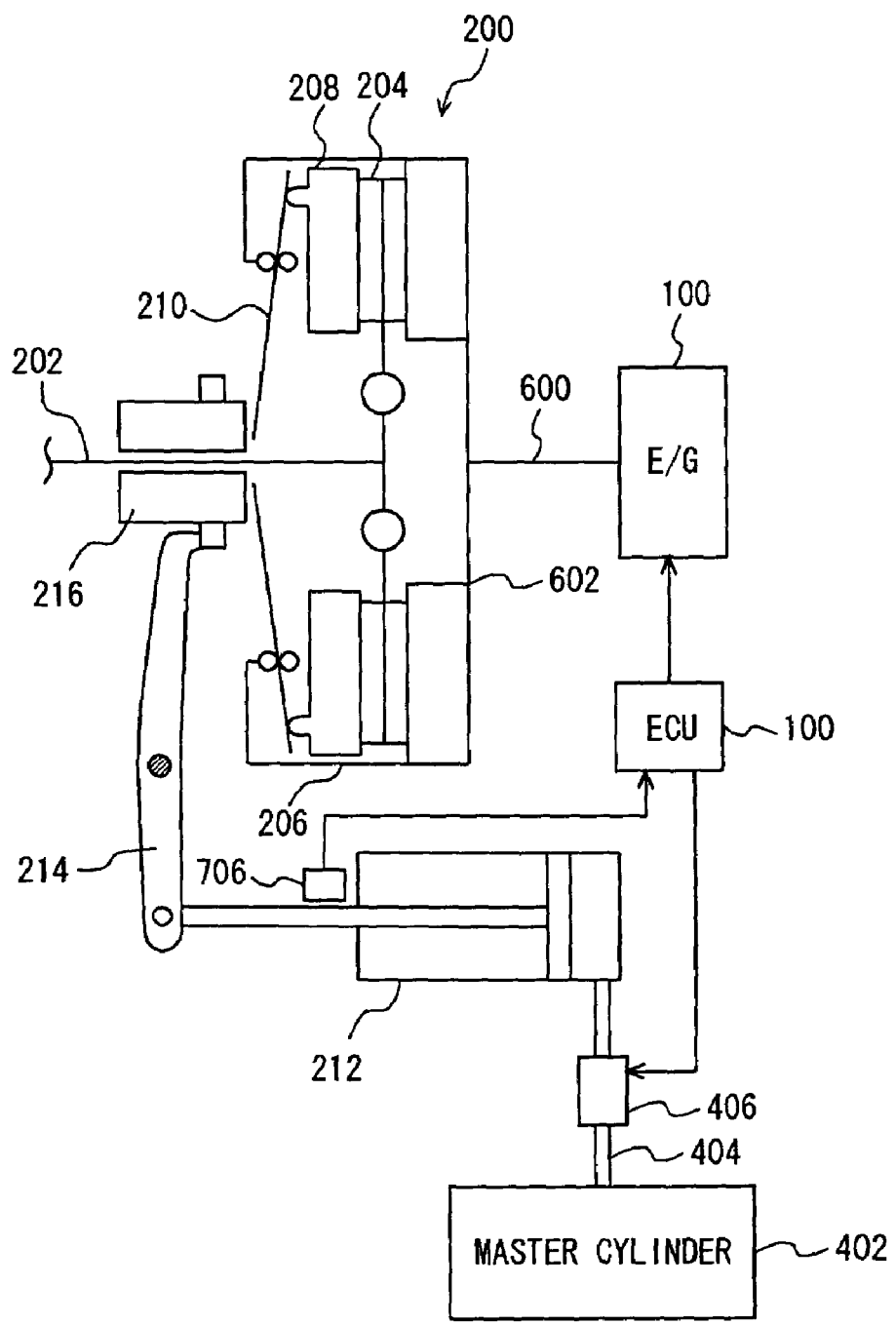
FIG. 2 is a diagram showing a clutch in FIG. 1.

Referring to FIG. 2, clutch 200 will further be described. Clutch 200 is a dry-type single plate friction clutch. As shown in FIG. 2, clutch 200 includes a clutch output shaft 202, a clutch disk 204 provided at clutch output shaft 202, a clutch housing 206, a pressure plate 208 provided at clutch housing 206, a diaphragm spring 210, a clutch release cylinder 212, a release fork 214, and a release sleeve 216.

When diaphragm spring 210 biases pressure plate 208 to the right in FIG. 2, clutch disk 204 is thereby pressed against a flywheel 602 attached to a crankshaft 600 of engine 100, so that clutch 200 is engaged.

When clutch release cylinder 212 moves release sleeve 216 to the right in FIG. 2 through release fork 214, an inner end of diaphragm spring 210 thereby moves to the right in FIG. 2. When the inner end of diaphragm spring 210 moves to the right in FIG. 2, pressure plate 208 moves to the left in FIG. 2, and hence clutch disk 204 and flywheel 602 are separated, so that clutch 200 is released.

Clutch release cylinder 212 operates by hydraulic pressure being supplied from a master cylinder 402 through a solenoid valve 406. When hydraulic pressure is supplied to clutch release cylinder 212, a piston of clutch release cylinder 212 moves to the left in FIG. 2, and hence release sleeve 216 moves to the right in FIG. 2, so that clutch is released.

When the driver depresses clutch pedal 400, hydraulic pressure is generated in master cylinder 402. The hydraulic pressure generated in master cylinder 402 is introduced into clutch release cylinder 212 through a pipe 404. Pipe 404 is provided with solenoid valve 406. The hydraulic pressure generated in master cylinder 402 is introduced into clutch release cylinder 212 through solenoid valve 406.

Solenoid valve 406 is a three-way valve of a normally-closed type that shuts off a path from master cylinder 402 to clutch release cylinder 212 when no electric power is distributed thereto: A valve other than the three-way valve may be used for solenoid valve 406.

When the driver depresses clutch pedal 400 while clutch 200 is in an engaged state, electric power distribution to solenoid valve 406 starts, so that master cylinder 402 is brought into communication with clutch release cylinder 212. The hydraulic pressure generated in master cylinder 402 is thereby introduced into clutch release cylinder 212 through solenoid valve 406.

When clutch 200 is in a released state, electric power distribution to solenoid valve 406 is stopped, so that the hydraulic pressure introduced from master cylinder 402 into clutch release cylinder 212 is maintained. Accordingly, even if the driver lifts his/her foot from clutch pedal 400, clutch 200 is maintained in the released state.

For example, if a condition that the driver depresses an accelerator pedal or other conditions is established, electric power distribution to solenoid valve 406 restarts, so that master cylinder 402 is brought into communication with clutch release cylinder 212. Accordingly, bias force of diaphragm spring 210 moves the piston of clutch release cylinder 212 to the right in FIG. 2, so that clutch 200 is brought back into the engaged state.

At that time, a flow rate of hydraulic fluid returned from clutch release cylinder 212 to master cylinder 402 is adjusted with solenoid valve 406, and thereby clutch 200 is brought into the engaged state in a desired manner. In other words, clutch 200 is engaged slowly or quickly.

Referring to FIG. 1 again, signals indicative of detection results are input to ECU 650 from a clutch pedal stroke sensor 700, an accelerator pedal position sensor 702, an amperemeter 704, and a stroke sensor 706.

Clutch pedal stroke sensor 700 detects an operated amount (a stroke amount) of clutch pedal 400. Accelerator pedal position sensor 702 detects a position of an accelerator pedal. Amperemeter 704 detects a value of current distributed to solenoid valve 406. Stroke sensor 706 detects a stroke amount of clutch release cylinder 212.

ECU 650 controls the power train to be in a desired state, based on the signals transmitted from these sensors and a map stored in a memory (not shown). In the present embodiment, ECU 650 performs idle stop, namely, automatically stops engine 100, when a predetermined stop condition is satisfied.

Figure 3:
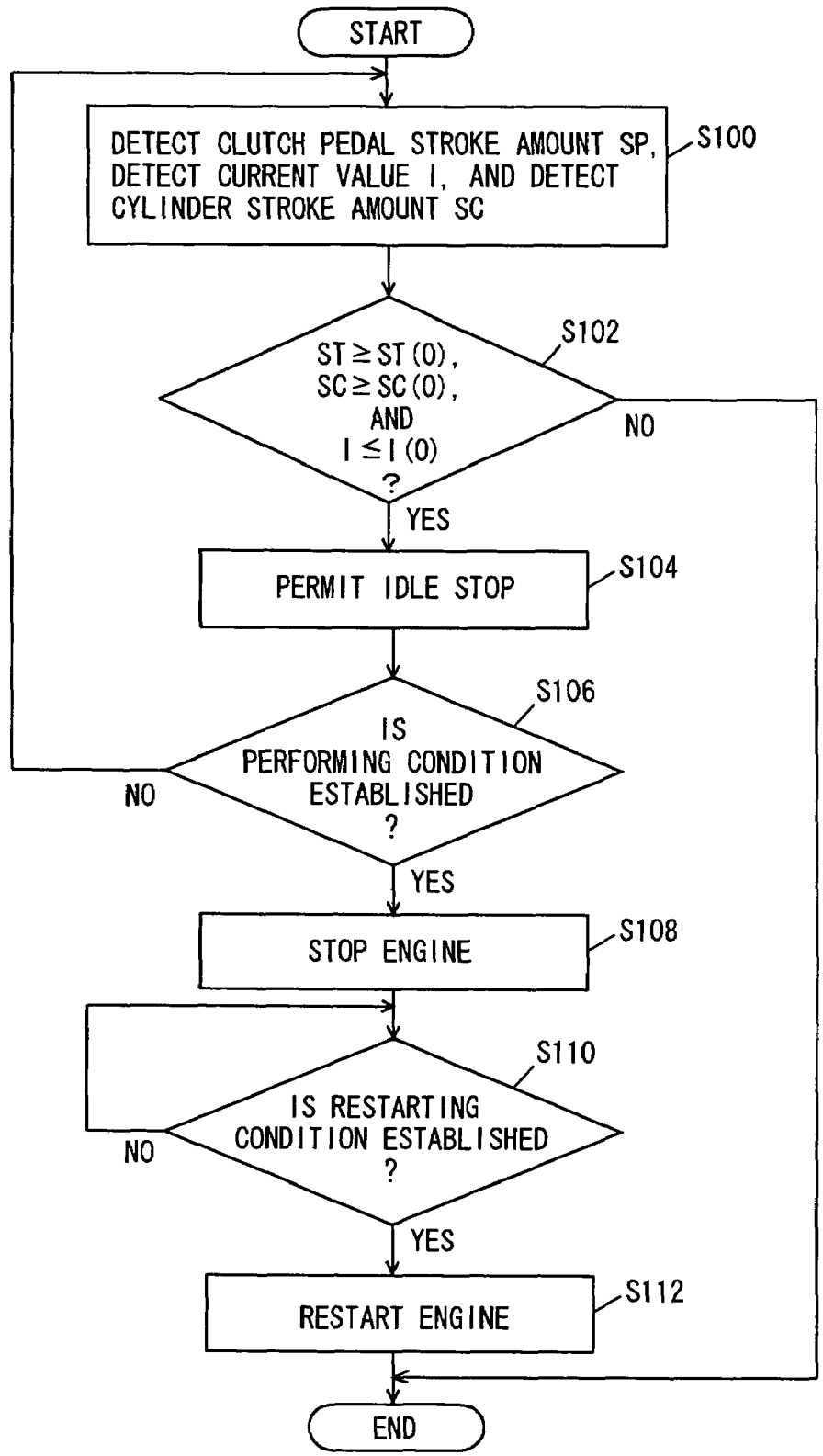
FIG. 3 is a flowchart showing a control structure of a program executed by an ECU in FIG. 1

Referring to FIG. 3, a control structure of a program executed by ECU 650 serving as an automatic stop device according to the present embodiment will be described.

In step (hereinafter abbreviated as S) 100, ECU 650 detects a stroke amount SP of the clutch pedal, based on the signal transmitted from clutch pedal stroke sensor 700. Furthermore, ECU 650 detects a value I of current distributed to solenoid valve 406, based on the signal transmitted from amperemeter 704. Furthermore, ECU 650 detects a stroke amount SC of clutch release cylinder 212, based on the signal transmitted from stroke sensor 706.

In S102, ECU 650 determines whether or not a condition that stroke amount SP of the clutch pedal is at least a threshold value SP(0), a condition that stroke amount SC of clutch release cylinder 212 is at least a threshold value SC(0), and a condition that value I of current is not larger than a threshold value I(0) are all satisfied. If all the conditions are satisfied (YES in S102), the process proceeds to S104. If not so (NO in S102), the process terminates.

In S104, ECU 650 permits performing of idle stop. In S106, ECU 650 determines whether or not a condition for performing idle stop is established. The condition for performing idle stop is, for example, a condition that a vehicle speed is not higher than a threshold value, or a condition that a brake pedal is depressed. If the performing condition is established (YES in S106), the process proceeds to S108. If not so (NO in S106), the process returns to S100.

In S108, ECU 650 stops engine 100. In S110, ECU 650 determines whether or not a condition for restarting engine 100 is established. The condition for restarting engine 100 is, for example, a condition that an accelerator pedal position is at least a threshold value, or a condition that clutch pedal 400 is operated again after the driver lifts his/her foot from clutch pedal 400. If the restarting condition is established (YES in S110), the process proceeds to S112. If not so (NO in S110), the process returns to S110. In S112, ECU 650 restarts engine 100. Thereafter the process terminates.

An operation of ECU 650 serving as the automatic stop device according to the present embodiment, based on the configuration and the flowchart above, will be described.

While the vehicle is driven, stroke amount SP of the clutch pedal, value I of current distributed to solenoid valve 406, and stroke amount SC of clutch release cylinder 212 are detected (S100).

Assume that the driver depresses clutch pedal 400 to bring clutch 200 into the released state. In this case, stroke amount SC of clutch release cylinder 212 turns to be at least threshold value SC(0), and stroke amount SP of the clutch pedal turns to be at least threshold value SP(0), so that clutch 200 is released. Then electric power distribution to solenoid valve 406 is stopped, so that value I of current flowing through solenoid valve 406 turns to be not larger than threshold value I(0) (S102).

In this case, even if the driver lifts his/her foot from clutch pedal 400, clutch 200 is maintained in the released state. In such a state, performing of idle stop is permitted (S104). In this state, if the condition for performing idle stop is established (YES in S106), engine 100 is stopped (S108).

In other words, at least a condition including the condition that clutch 200 is in the released state, and the condition that the amount of electric power distributed to solenoid valve 406 is smaller than the threshold value is satisfied, idle stop is performed.

Accordingly, when electric power consumption in solenoid valve 406 is small, idle stop can be performed. It is therefore possible to reduce power consumption in the vehicle, and eventually further improve fuel efficiency.

Afterwards, if the restarting condition is established (YES in S110), engine 100 is restarted (S112). At that time, clutch 200 is in the released state, and hence it is possible to prevent the vehicle from accidentally moving.

As described above, according to the ECU serving as the automatic stop device according to the present embodiment, when it is recognized that no electric power is distributed to the solenoid valve of a normally-closed type in a state where the clutch is recognized as being in the released state from stroke amount SP of the clutch pedal and stroke amount SC of the clutch release cylinder, performing of idle stop is permitted. Accordingly, when power consumption in the solenoid valve is small, idle stop can be performed. It is possible to reduce power consumption in the vehicle, and eventually further improve fuel efficiency. In addition, idle stop is performed while the clutch is brought into the released state, and hence it is possible to prevent the vehicle from accidentally moving when the engine is restarted.

In the present embodiment, stroke amount SP of clutch pedal 400 and stroke amount SC of clutch release cylinder 212 are used to determine the state of clutch 200. However, in place of, or in addition to the stroke amounts, hydraulic pressure output from master cylinder 402 may be used.

Performing of idle stop is permitted when clutch 200 is maintained in the released state. However, in addition to this, performing of idle stop may be permitted when transmission 300 is in a neutral state.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic stop device for an internal combustion engine coupled to a transmission through a frictional engagement element brought into a released state by pressure generated by an operation of an operation unit, comprising:
   a control member provided between said operation unit and said frictional engagement element such that pressure applied to said frictional engagement element is maintained when no electric power is distributed to the control member; and
   a stop control unit stopping said internal combustion engine when a predetermined stop condition is satisfied,
   said stop condition being at least a condition that said frictional engagement element is in the released state and a condition that an amount of electric power distributed to said control member is smaller than a predetermined value.

2. The automatic stop device for the internal combustion engine according to claim 1, wherein
   said frictional engagement element is brought into the released state by hydraulic pressure generated by the operation of said operation unit, and
   said control member shuts off an oil passage connecting said operation unit and said frictional engagement element when no electric power is distributed to the control member.

3. An automatic stop device for an internal combustion engine coupled to a transmission through a frictional engagement element brought into a released state by pressure generated by an operation of an operation unit, comprising:
   a control member provided between said operation unit and said frictional engagement element such that pressure applied to said frictional engagement element is maintained when no electric power is distributed to the control member; and
   stop control means for stopping said internal combustion engine when a predetermined stop condition is satisfied,
   said stop condition being at least a condition that said frictional engagement element is in the released state and a condition that an amount of electric power distributed to said control member is smaller than a predetermined value.

4. The automatic stop device for the internal combustion engine according to claim 3, wherein
   said frictional engagement element is brought into the released state by hydraulic pressure generated by the operation of said operation unit, and
   said control member shuts off an oil passage connecting said operation unit and said frictional engagement element when no electric power is distributed to the control member.

5. A method of automatically stopping an internal combustion engine coupled to a transmission through a frictional engagement element brought into a released state by pressure generated by an operation of an operation unit, comprising the steps of:
   determining whether or not said frictional engagement element is in the released state;
   determining whether or not an amount of electric power distributed to a control member is smaller than a predetermined value, the control member being provided between said operation unit and said frictional engagement element for maintaining pressure applied to said frictional engagement element when no electric power is distributed thereto; and
   stopping said internal combustion engine on conditions that it is determined that said frictional engagement element is in the released state, and that it is determined that the amount of electric power distributed to said control member is smaller than the predetermined value.

* * * * *

UNITED STATES PATENT AND TRADEMARK OFFICE
CERTIFICATE OF CORRECTION

PATENT NO.        : 7,534,196 B2
APPLICATION NO. : 11/522392
DATED              : May 19, 2009
INVENTOR(S)      : Ido

It is certified that error appears in the above-identified patent and that said Letters Patent is hereby corrected as shown below:

On the title page, Item (73), the Assignee's information is incorrect. Item (73) should read:

-- (73) Assignee: Toyota Jidosha Kabushiki Kaisha,
Toyota-shi (JP) --

Signed and Sealed this

Fourteenth Day of July, 2009

JOHN DOLL
*Acting Director of the United States Patent and Trademark Office*